United States Patent [19]
Kim et al.

[11] Patent Number: 5,849,820
[45] Date of Patent: Dec. 15, 1998

[54] THERMAL STABILIZED RESIN COMPOSITIONS

[75] Inventors: Kyung Min Kim, Kumi; Sang Hee Jang, Taegu; Eun Ha Park, Chungchongnam-do, all of Rep. of Korea

[73] Assignee: Kolon Industries, Inc., Seoul, Rep. of Korea

[21] Appl. No.: 663,307

[22] PCT Filed: Dec. 28, 1994

[86] PCT No.: PCT/KR94/00184

§ 371 Date: Jun. 26, 1996

§ 102(e) Date: Jun. 26, 1996

[87] PCT Pub. No.: WO95/18181

PCT Pub. Date: Jul. 6, 1995

[30] Foreign Application Priority Data

Dec. 30, 1993 [KR] Rep. of Korea ................ 1993/31499

[51] Int. Cl.$^6$ ...................................................... C08K 5/35
[52] U.S. Cl. ................................ 524/95; 524/96; 524/97

[58] Field of Search .................................... 524/95, 96, 97

[56] References Cited

U.S. PATENT DOCUMENTS 4,446,262  5/1984  Okumura et al. ......................... 524/89
5,079,284  1/1992  Nakane et al. ........................... 524/97

*Primary Examiner*—Kriellion S. Morgan
*Attorney, Agent, or Firm*—Oblon, Spivak, McClelland, Maier & Neustadt, P.C.

[57] ABSTRACT

Thermally stabilized resin compositions are provided which contain one or more cyclic iminoether compounds represented by formula (I), cyclic iminoester compounds represented by formula (II), or both and an amine thermal stabilizer, wherein X is as described herein, and A and B are each, independently, a single bond, substituted or unsubstituted alkylene selected from the group consisting of methylene, ethylene, propylene, butylene, 1-methylethylene, 1,1-dimethylethylene, 1,2-dimethylene, 1-ethylethylene, 1-1-diethylethylene, 1-propylethylene, 1-butylene, 1-hexylethylene, and 1-methyltrimethylene.

7 Claims, No Drawings

THERMAL STABILIZED RESIN COMPOSITIONS

TECHNICAL FIELD

The present invention relates to stabilized resin compositions. More particulary, the invention relates to stabilized resin compositions having excellent stability to deterioration by thermal oxidation.

BACKGROUND ART

Many polymer materials tend to deteriorate to low molecular weight chains upon exposure to heat or light due to thermal oxidation with oxygen.

Thermal oxidation depends on the structure of the resins, and it is possible to estimate the difference in thermal stability based on the difference in structure.

Moreover, the thermal stability requirements of a single resin will often depend on its intended use, since the environment in which the resin is used, particularly the temperature and light conditions, can differ depending on the use of the final product made from the resin.

Another factor which can dominate the thermal stability requirement is whether the resin will be used in a molding process.

Even when molding materials are used in circumstances that are not normally extreme, it is essential to give thermal stability to a resin when it is molded at a temperature which is close to or higher than its degradation temperature.

For example, even when a partial structure of an aromatic polymer has excellent thermal stability and stiffness due to its high glass transition temperature, many problems can be encountered commercially because the resin degradation temperature is similar to the processing temperature.

Some resins having a polar site in their chain structure, or having an extremely low glass transition temperature, also have thermal stability problems when molded or used. These differences in thermal stability, even in resins having the same structure, act as a quality difference which can dominate the competitiveness of commodities made from such resins.

One solution which has been proposed is to incorporate stabilizers (thermal stabilizer, UV stabilizer) into resins in order to improve their stability.

Stabilizers such as thermal stabilizers, UV stabilizers, hydrolysis stabilizers, and antistatic agents have been developed and it is possible to choose them based on the product end use and/or the particular type of stability desired, i.e., heat or light stability.

Generally, the most frequently encountered form of degradation is from heat, especially when the resin is molded or used. Accordingly, various methods have been proposed in order to improve the thermal stability of resins such as modification of resin structure and addition of stabilizers.

U.S. Pat. No. 3,723,427 discloses a tris(hydroxylbenzyl) cyanurate stabilizer also known as a hindered phenolic primary thermal stabilizer. U.S. Pat. No. 3,758,549 proposes a thioester type secondary thermal stabilizer and discloses mixing the secondary stabilizer with a phenolic primary thermal stabilizer.

U.S. Pat. No. 3,966,675 and U.S. Pat. No. 4,414,408 disclose improving resin stability by mixing a primary stabilizer with a secondary stabilizer to provide a "synergistic" effect.

U.S. Pat. No. 4,069,200 discloses a method to improve the thermal stability of polyolefin resin by using a single hindered phenol primary thermal stabilizer, such as 6-t-butyl-2,3-dimethyl-4-(dimethylaminomethyl)-phenol, 6-t-octyl-2,3-dimethyl-4-(dimethylaminomethyl)-phenol, 6-t-butyl-4-(dimethylaminomethyl)-5,6,7,8-tetrahydro-1-naphthol, 5-t-butyl-2,3-dimethyl-4-hydroxybenzylphosphonate or by mixing the above-mentioned hindered phenol type primary thermal stabilizer with a thioester type secondary thermal stabilizer such as dilaurylthiodipropionate or distearylthiodipropionate.

U.S. Pat. No. 4,185,003 discloses a method to improve the stability of a copolyetherester by mixing a phenol type thermal stabilizer such as N,N'-hexamethylenebis(3,5-di-t-butyl-4-hydroxyhydrocinnamide) with hindered amine light stabilizer.

U.S. Pat. No. 4,405,749 seeks to improve the stability of a polyester resin by using 1,3,5-tris-(2-hydroxyethyl)-s-triazine-2,4,6-(1H,3H,5H)trion and an ester of 3,5-di-t-butyl-4-hydroxyhydrocinnamic acid.

Japanese Patent No. 88-38371 proposes a method for preparing a stabilizer having a high content of the dimer of 2,2,4-trimethyl-1,2-dihydroquinoline. Japanese Patent No. 88-40817 discloses a method to use these 2,2,4-trimethyl-1,2-dihydroquinoline type compounds and a phenothiadine type compound.

And Japanese Patent No. 88-40819 proposes a method to improve resin stability by mixing a 2,2,4-trimethyl-1,2-dihydroquinoline type compound and 2-mercaptobenzoimidazole or 2-mercaptomethylbenzoimidazole into the resin.

DISCLOSURE OF INVENTION

Accordingly, one object of the present invention is to provide thermally stabilized resin compositions which provide significant improvements in the thermal stability, compared to the use of conventional thermal stabilizers, by the addition of a combination of a thermal stabilizer with either or both of a cyclic iminoether or iminoester compound.

This and other objects of the present invention have been satisfied by the discovery that the addition of a cyclic iminoether, a cyclic iminoester, or both, in combination with an amine thermal stablizer provides resin compositions having improved thermal stability compared to conventionally stabilized resins.

The present invention relates to thermally stabilized compositions which comprise, as a thermal stabilizer, one or more cyclic iminoether compounds or cyclic iminoester compounds and an amine compound. The cyclic iminoether or iminoester and amine compounds of the present invention are added to the resin in an amount sufficient to provide thermal stability.

Preferably, 0.02~5.0 wt. % of one or more cyclic iminoether compounds represented by formula (I) or cyclic iminoester compounds represented by formula (II) and 0.02~3.0 wt. % of an amine compound are added to the resin as thermal stabilizer:

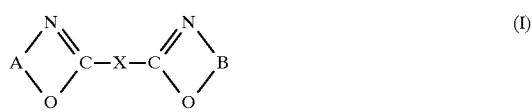

(I)

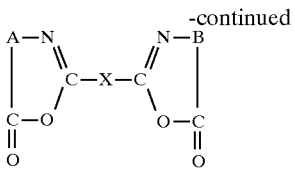

Wherein, X is a single bond or a divalent organic group selected from $C_3$~$C_{10}$ alkylene, arylene selected from the group consisting of phenylene, naphthalene, and biphenylene, cyclic alkylene selected from the group consisting of cyclohexylene and cyclohexanedimethylene and $C_3$~$C_{10}$ alkylene containing a hetero atom.

A and B are each, independently, a single bond, substituted or unsubstituted alkylene selected from the group consisting of methylene, ethylene, propylene, butylene, 1-methylethylene, 1,1-dimethylethylene, 1,2-dimethylene, 1-ethylethylene, 1,1-diethylethylene, 1-propylethylene, 1-butylene, 1-hexylethylene, and 1-methyltrimethylene.

Preferably, X is a single bond or phenylene.

X is most preferably a para-phenylene ring when it is to be used in resins having a high melting point since the para phenylene compounds have high melting points themselves. When low melting point resins are used, X is preferably metaphenylene.

X can also be a group of formula (III).

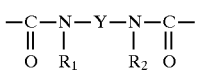

Wherein, $R_1$ and $R_3$ are each, independently, selected from the group consisting of hydrogen, methyl, ethyl, propyl, butyl, hexyl, octyl, decyl, phenyl, tolyl, cyclohexyl, and benzyl.

Y is a divalent organic group selected from the group consisting of ethylene, propylene, butylene, pentamethylene, hexamethylene, octamethylene, nonamethylene, decamethylene, phenylene, naphthalene and diphenylene or a group of formula (IV).

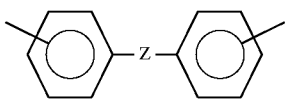

Wherein, Z is a member selected from the group consisting of —O—, —CO—, —S—, —$SO_a$—, —$CH_a$—, —$CH_2CH_2$—, or —$C(CH_3)_2$—, cyclopentylene, cyclohexylene, methylene-phenylene and methylene-phenylene-methylene.

The iminoether rings or iminoester rings preferably have 5~7 membered rings, and A and B can be the same or different.

In the present invention, the thermal stability of resins is surprisingly and significantly improved due to a synergistic effect caused by mixing the cycloiminoether and/or cycloiminoester compounds with the amine compounds.

The total amount of thermal stabilizer (total of cycloiminoether, cycloiminoester and amine) added for improving thermal stability is 0.04~6.0% by weight of resin. When the total amount is less than 0.04% by weight, no significant improvement in thermal stability is seen. When the amount exceeds 6.0% by weight, any additional improvement in thermal stability is not proportional to the additional amount of additives used (i.e., the added costs outweigh the added benefits).

There are many commercially available grafted resins which already contain a cycliciminoether or cyclicimi-noester. These include polystyrene or polyacrylonitrile grafted with a cyclic imino-ether. Such grafted resins can be used in the plane of the cyclic iminoether (I) or iminoester (II) of the present invention.

Cyclic iminoether compounds that can be used in the present invention are known as bisoxazoline compounds when the number of carbon atoms in each of A and B is 2, and are known as bis(5,6-dihydro-oxazines) when A and B have 3 carbons each. Suitable cycloimino-ethers for use alone, or in mixtures of two or more, include 2,2'-bis (2-oxazoline), 2,2'-bis(4-methyl-2-oxazoline), 2,2'-bis(4,4-dimethyl-2-oxazoline), 2,2'-bis(4-ethyl-2-oxazoline), 2,2'-bis(4,4-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(5,6-dihydro-4H-1,3-oxazine), 2,2'-bis(4-methyl-5,6-dihydro-4H-1,3-oxazine), 2,2'-bis(4-ethyl-5,6-dihydro-4H-1,3-oxazine), 2,2'-bis(4,4-dimethyl-5,6-dihydro-4H-1,3-oxazine),
2,2'-o-phenylenebis(2-oxazoline),
2,2'-m-phenylenebis(2-oxazoline),
2,2'-p-phenylenebis(4-methyl-2-oxazoline),
2,2'-p-phenylenebis(4,4-dimethyl-2-oxazoline),
2,2'-m-phenylenebis(4-methyl-2-oxazoline),
2,2'-m-phenylenebis(4,4-dimethyl-2-oxazoline),
2,2'-ethylenebis(2-oxazoline),
2,2'-tetramethylenebis(2-oxazoline),
2,2'-hexamethylenebis(2-oxazoline),
2,2'-octamethylenebis(2-oxazoline),
2,2'-decamethylenebis(2-oxazoline),
2,2'-ethylenebis(4-methyl-2-oxazoline),
2,2'-tetramethylenebis(4-methyl-2-oxazoline),
2,2'-hexamethylenebis(4-methyl-2-oxazoline),
2,2'-octamethylenebis(4-methyl-2-oxazoline),
2,2'-decamethylenebis(4-methyl-2-oxazoline),
2,2'-ethylenebis(4,4'-dimethyl-2-oxazoline),
2,2'-tetramethylenebis(4,4'-dimethyl-2-oxazoline),
2,2'-hexamethylenebis(4,4'-dimethyl-2-oxazoline),
2,2'-octamethylenebis(4,4'-dimethyl-2-oxazoline),
2,2'-decamethylenebis(4,4'-dimethyl-2-oxazoline),
2,2'-diphenoxyethanebis(2-oxazoline),
2,2'-dicyclohexylenebis(2-oxazoline),
2,2'-diphenylenebis(4-methyl-2-oxazoline),
N,N'-ethylenebis(2-carbamoyl-2-oxazoline),
N,N'-trimethylenebis(2-carbamoyl-2-oxazoline),
N,N'-tetramethylenebis(2-carbamoyl-2-oxazoline),
N,N'-hexamethylenebis(2-carbamoyl-2-oxazoline),
N,N'-octamethylenebis(2-carbamoyl-2-oxazoline),
N,N'-decamethylenebis(2-carbamoyl-2-oxazoline),
N,N'-phenylenebis(2-carbamoyl-2-oxazoline),
N,N'-ethylenebis(2-carbamoyl-4-methyl-2-oxazoline),
N,N'-tetramethylenebis(2-carbamoyl-4,4-dimethyl-2-oxazoline),
N,N'-ethylenebis(2-carbamoyl-5,6-dihydro4H-1,3-oxazine),
N,N'-trimethylenebis(2-carbamoyl-5,6-dihydro-4H-1,3-oxazine),
N,N'-tetramethylenebis(2-carbamoyl-5,6-dihydro-4H-1,3-oxazine),
N,N'-hexamethylenebis(2-carbamoyl-5,6-dihydro-4H-1,3-oxazine),
N,N'-octamethylenebis(2-carbamoyl-5,6-dihydro-4H-1,3-oxazine),
N,N'-decamethylenebis(2-carbamoyl-5,6-dihydro-4H-1,3-oxazine), N,N'-phenylenebis(2-carbamoyl-5,6-dihydro-4H-1,3-oxazine),
N,N'-ethylenebis(2-carbamoyl-4-methyl-5,6-dihydro-4H-1,3-oxazine),
N,N'-hexamethylenebis(2-carbamoyl-4,4-dimethyl-5,6-dihydro-4H-1,3-oxazine),
N,N'-dimethyl-N,N'-ethylenebis(2-carbamoyl-2-oxazoline),
N,N'-dimethyl-N,N'-tetramethylenebis(2-carbamoyl-2-oxazoline),
N,N'-dimethyl-N,N'-tetramethylenebis(5,6-dihydro-4H-1,3-oxazine),
2,2'-ethylenebis(5,6-dihydro-4H-1,3-oxazine),
2,2'-prophylenebis(5,6-dihydro-4H-1,3-oxazine),
2,2'-hexamethylenebis(5,6-dihydro-4H-1,3-oxazine),
2,2'-p-phenylenebis(5,6-dihydro-4H-1,3-oxazine),
2,2'-m-phenylenebis(5,6-dihydro-4H-1,3-oxazine),
2,2'-naphthylenebis(5,6-dihydro-4H-1,3-oxazine), and
2,2'-p,p'-diphenylenebis(5,6-dihydro-4H-1,3-oxazine).

Cycloiminoester compounds represented by formula (II) of the present invention, which can be used alone or in combinations of two or more, include
2,2'-bis(3,1-benzooxazine-4-on),
2,2'-methylenebis(3,1-benzooxazine-4-on),
2,2-ethylenebis(3,1-benzooxazine-4-on),
2,2'-hexamethylenebis(3,1-benzooxazine-4-on),
2,2'-octamethylenebis(3,1-benzooxazine-4-on),
2,2'-decamethylenebis(3,1-benzooxazine-4-on),
2,2'-p-phenylenebis(3,1-benzooxazine-4-on),
2,2'-m-phenylenebis(3,1-benzooxazine-4-on),
2,2'-naphthylenebis(3,1-benzooxazine-4-on),
2,2'-(4,4'-diphenylene)bis(3,1-benzooxazine-4-on),
2,2'-(1,4-cyclohexylene)bis(3,1-benzooxazine-4-on),
2,2'-bis(4,5-dihydro-1,3,6H-oxazine-6-on),
2,2'-p-phenylenebis(4,5-dihydro-1,3,6H-oxazine-6-on),
2,2'-p-phenylenebis(4-methyl-5-hydro-1,3,6H-oxazine-6-on),
2,2'-p-phenylenebis(5(4H)-oxazolon),
2,2'-tetramethylenebis(4-methyl-5(4H)-oxazolon),
2,2'-hexamethylenebis(4-methyl-5(4H)-oxazolon),
2,2'-tetramethylenebis(4,4-dimethyl-5(4H)-oxazolon),
2,2'-hexamethylenebis(4,4-dimethyl-5(4H)-oxazolon), and
2.2'-p-phenylenebis(4,4-dimethyl-5(4H)-oxazolon).

If the cycloiminoether or cycloiminoester compound is used alone, the thermal stability of the resin is slightly improved while molecular weight is increased due to reaction with the polymer chain.

But if an amine thermal stabilizer is used in admixture with the cycloiminoether or cycloiminoester of the present invention, the resin has significantly improved thermal stability compared to the thermal stability obtained by using conventional thermal stabilizers.

Suitable amine thermal stabilizers include 2,2,4-trimethyl-1,2-dihydroquinoline (a conventional thermal stabilizer) or its polymer, phenyl-(β-naphthyl)amine, phenyl-(α-naphthyl)amine, α-naphthylamine, N,N'-di-sec-butyl-p-phenylenediamine, N,N'-diphenyl-p-pneylenediamine, N,N'-di-β-naphthyl-p-phenylenediamine, 4,4'-tetramethyldiaminodi phenylmethane, aldol-α-naphthylamino, N,N'-bis(1-methyl-heptyl)-p-ph enylenediamine, N,N'-bis(1-ethyl-3-methylphenyl)-p-phenylenediamine, p-iso-propoxyldiphenylamine, 6-ethoxy-2,2,4-trimethyl-1,2-dihydroquin oline, N-phenyl-N'-isopropyl-p-phenylenediamine, 4,4'-bis(4-α,α-di methylbenzoyl)diphenylamine, 2,6-di-t-butyl-α-dimethylamino-p-cresol, N-cyclohexyl-N'-phenyl-p-phenylenediamine, dioctyl-p-phenylenediamine, phenylhexyl-p-phenylenediamine, phenyl-octyl-p-phenylenediamine, dihep tyl-p-phenylenediamine, oxalylbis (benzylidenedihydrazide), 6-(4-hy droxy-3,5-di-t-butylanilino)-2,4-bisoctyl-thio-1,3,5-triazine, 3-(N-salicyloyl)amino-1,2,4-triazole, p,p'-dioctyl diphenylamine, di-o-to lyl-guanidine salt of dicatecholborate, di-o-tollthiourea, thiocarba nilide, zinc diethyl dithiocarbamate, 2-mercaptobenzimidazole, zinc 2-mercaptobenzimidazolate, 2-mercaptomethylbenzimidazole, zinc 2-mer captomethylbenzimidazolate, N-1,3-dimethylbutyl-N'-phenyl-p-phenylene diamine, diethylhydroxylamine, 1,3-dibutylthiourea, 1,3-diethylth iourea, phenothiazine, N-(2-ethyl-phenyl-)-N'-(2-ethoxy-5-t-butylphe nol)oxalic acid diamine, o-tolyl-biguanide, N,N'-diphenylethylenedia mine, N,N'-diphenyl propylenediamine, N,N'-di-o-tolyl-ethylenediamine, N-lauryl-p-aminophenol, N-stearyl-p-aminophenol, ethylenethiourea, p,p-dimethoxydiphenylamine, N-octyl-N'-phenyl-p-phenylenediamine and N,N'-di-(1,4-dimethyl-pentyl)-p-phenylenediamine.

Resins which are stabilized by the composition of the present invention include most conventional thermoplastic and thermosetting resins. Suitable resins include conventional plastics such as polyethylene LLDPE(linear low density polyethylene), polypropylene, polybutylene, polystyrene, polyvinylchloride, polyacrylonitrile, and ABS (acrylonitrile-butadiene-styrene), engineering plastics such as polyacetal, polyester, polyamide, polycarbonate, and polyphenylene oxide, rubbers such as natural rubber, butadiene rubber, nitrile rubber, isoprene, chloroprene and acryl rubber, thermoplastic elastomers such as styrene-butadiene elastomer, urethane elastomer, olefin elastomer, ester elastomer and amide elastomer, and mixtures of these resins.

The best improvements in thermal stability are seen when the thermal stabilizers of the present invention are added to resins having a carboxyl group in the molecular chain, such as polyesters, and to resins having an amine end group in the chain, such as polyamides and polyurethanes.

Engineering plastics such as rubber, thermoplastic elastomer, polyester and polyamide are especially stabilized by the compositions of the present invention.

In preparing the compositions of the present invention, the thermal stabilizers of formula (I), formula(II) and the amine thermal stabilizers can be added either during the polymerization of the resin used in the composition, or after the resin has been prepared. If the stabilizers are added after polymerization of the resin, the stabilizers can be added using an intensive mixing means, such as a single or twin screw extruder, with the stabilizers being added through either the primary opening along with the resin, or through a secondary opening along the extruder path.

Having generally described this invention, a further understanding can be obtained by reference to certain specific examples which are provided herein for purposes of illustration only and are not intended to be limiting unless otherwise specified.

EXAMPLES

The various properties in the examples and comparative examples were measured in accordance with the following procedures.

1. Tensile strength(kg/cd): measured by ASTM-D-638
2. Elongation(%): measured by ASTM-D-638
3. Impact strength(kg·cm/cm): measured by ASTM-D-256(NOTCHED IZOD method)
4. Thermal stability(%): After being heat-treated at specific temperature for specific time, thermal stability is expressed as the ratio of maintained properties to initial properties. Measured properties, temperature and time are varied according to materials.

In the examples presented herein, the following symbols have the meanings given below.

1. A Q N (amine type thermal stabilizer)
   A: 2,2,4-trimethyl-1,2-dihydroquinoline
   B: polymerized 2,2,4-trimethyl-1,2-dihydroquinoline
   C: phenyl-β-naphthylamine
   D: N,N'-di-β-naphthyl-p-phenylenediamine
   E: N,N'-diphenyl-p-phenylenediamine
   F: N-phenyl-N'-isopropyl-p-phenylenediamine
   G: 4,4'-bis(4-α,α-dimethylbenzoyl)diphenylamine
   H: N-cyclohexyl-N'-phenyl-p-phenylenediamine
   I: mercaptomethylbenzimidazole
   J: N,N'-di-o-tolyl-ethylenediamine
2. S A O (cyclic iminoether or iminoester compound) (A~I; cyclic iminoether compound J~M; cyclic iminoester compound)
   A: 2,2'-bis(2-oxazoline)
   B: 2,2'-bis(4-methyl-2-oxazoline)
   C: 2,2'-bis(4,4-dimethyl-2-oxazoline)
   D: 2,2'-bis(4-phenyl-2-oxazoline)
   E: 2,2'-bis(5,6-dihydro-4H-1,3-oxazine)
   F: N,N'-trimethylenebis(2-carbamoyl-2-oxazoline)
   G: 2,2'-metaphenylenebis(2-oxazoline)
   H: 2,2'-hexamethylenebis(2-oxazoline)
   I: N,N'-dimethyl-N,N'-tetramethylenebis(5,6-dihydro-4H-1,3-oxazoline)
   J: 2,2'-bis(3,1-benzooxazine-4-on)
   K: 2,2'-ethylenebis(3,1-benzooxazine-4-on)
   L: 2,2'-(4,4'-diphenylene)bis(3,1-benzooxazirie-4-on)
   M: 2,2'-tetramethylenebis(4-methyl-5(4H)-oxazolon)

<Example 1>

SPESIN KP 210(KOLON INC. KOREA), polybutylene terephthalate resin (PBT) having an intrinsic viscosity of 1.0 dl/g was added through the main feeder of two axis screw type extruder, and 0.5 wt. % of each 2,2, 4-trimethyl-1,2-dihydroquinoline and 2,2'-m-phenylenebis(2-oxazoline) as thermal a stabilizer, based on the total 100 wt. % of PBT, were added through a secondary feeder, respectively, and mixed to prepare thermally stabilized resin compositions.

The temperature of the various zones of the extruder was 200° C., 230° C., 245° C., 250° C., 240° C. in the order, from main feeder to die, and the rpm of the screw was 200.

Mixed resins were extruded as spaghetti form, cooled in cooling water of 35° C. and pelletized through pelletizer.

The moisture of the stabilized PBT prepared by the present process was removed at a temperature of 100° C. for 6 hrs by using a hot air dryer, and samples for measuring properties were injection molded by using an injection molding machine having 150 tons of clamping for The resultant properties are provided in Table 2.

<Example 2–6>

The same procedure was carried out as described in Example 1 with the amount of components and properties provided in Table 1 and 2. respectively.

<Comparative Example 1>

The same procedure was carried out as described in Example 1 except using a single amine-type thermal stabilizer with the amount of component povided in Table 1.

<Comparative Example 2>

The same procedure was carried out as described in Example 1 except using a single cyclic iminoester thermal stabilizer with the amount of component provided in Table 1.

<Comparative Example 3>

The same procedure was carried out as described in Example 1 except no additives or stabilizers were used.

<Comparative Example 4>

The same procedure was carried out as described in Example 1 except using 0.5 wt. % of tetrakis[methylene-3-(3,5-di-t-butyl-4-hydroxyphenyl)propionate]methane as a phenol type thermal stabilizer.

<Comparative Example 5>

The same procedure was carried out as described in Example 1 except using 0.2 wt. % of tetrakis[methylene-3-(3,5-di-t-butyl-4-hydroxyphenyl)propionate]methane as a phenol type thermal stabilizer and 0.4 wt. % of tris(t-butyl-phenyl)phosphite as thermal stabilizer.

<Comparative Example 6>

The same procedure was carried out as described in Example 1 except using 0.2 wt. % of tetrakis[methylene-3-(3,5-di-t-butyl-4-hydroxyphenyl)propionate]methane as a phenol type thermal stabilizer and 0.4 wt. % of N,N'-diphenyl-p-phenylenediamine as thermal stabilizer.

<Comparative Example 7>

The same procedure was carried out as described in Example 1 except using 0.2 wt. % of tetrakis[methylene-3-(3,5-di-t-butyl-4-hydroxyphenyl)propionate]methane as a phenol type thermal stabilizer and 0.4 wt. % of distearylthiodipropionate as thermal stabilizer.

<Comparative Example 8>

The same procedure was carried out as described in Example 1 except using 0.4 wt. % of tetrakis[methylene-3-(3,5-di-t-butyl-4-hydroxyphenyl)propionate]methane as a phenol type thermal stabilizer and 0.5 wt. % of 2,2'-metaphenylenebis(2-oxazoline) as thermal stabilizer.

<Comparative Example 9>

The same procedure was carried out as described in Example 1 except using 0.4 wt. % of tris(t-butyl-phenyl) phosphite and 0.5 wt. % of 2,2'-meta-phenylenebis(2-oxazoline) as thermal stabilizer.

<Comparative Example 10>

The same procedure was carried out as described in Example 1 except using 0.4 wt. % of distearylthiodipropionate and 0.5 wt. % of 2,2'-meta-phenylenebis(2-oxazoline) as thermal stabilizer.

<Example 7>

2 kg of dimethylterephthalate, 1.4 kg of 1,4-butanediol and 2 g of tetrabutyltitanate as catalyst was added to a reactor equipped with a stainless steel stirrer, temperature and pressure controller and the reaction temperature was raised to 140° C. slowly at normal pressure.

The reaction temperature was raised over the period of 1.5 hrs to 210° C. and the methanol which is the by-product of the ester exchange reaction, was removed from the reactor.

After 630 g of methanol was removed, and esterification was completed, 11.3 g(0.5 wt. % on the basis of polymer) of 2,2'-bis(5,6-dihydro-4H-1,3-oxazine) and 6.8 g(0.3 wt. % on the basis of polymer) of 4,4'-bis(4- α,α-dimethylbenzoyl) diphenylamine as thermal stabilizer were added thereto and stirred. The temperature was elevated to 250° C. and the pressure was abated from normal pressure to 0.1 mmHg slowly.

The condensation reaction was carried out for 35 minutes under 0.1 mmHg and polymerization was completed.

The intrinsic viscosity, measured at 23° C. in o-chlorophenol was 0.87 dl/g, with a melting point of 223° C.

The PBT resin obtained was dried and extruded the same as in Example 1, and then thermal stability thereof was measured.

The results are provided in Table 1.

<Comparative Example 11>

The same procedure was carried out as described in Example 7 except that 11.3 g(0.5 wt. % on the basis of polymer) of 2,2'-bis(5,6-dihydro-H-1,3-oxazine) as thermal stabilizer was added, <Comparative Example 12>

The same procedure was carried out as described in Example 7 except that 6.8 g(0.3 wt. % on the basis of polymer) of 4,4'-bis(4-α,α-dimethylbenzoyl) diphenylamine) as thermal stabilizer was added.

<Comparative Example 13>

The same procedure was carried out as described in Example 7 except that 22.7 g(1.0 wt. % on the basis of polymer) of tetrakis[methylene-3-(3,5-di-t-butyl-hydroxy-phenyl)propionate]methane as a thermal stabilizer was added.

<Comparative Example 14>

The same procedure was carried out as described in Example 7 except that 6.8 g of tetrakis[methylene-3-(3,5-di-t-butylhydroxy-phenyl)propionate]methane and 11.3 g(0.5 wt. % on the basis of polymer) of distearylthiodipropionate as thermal stabilizer was added.

<Example 8~13, Comparative Example 15~18>

The same procedure was carried out as described in Example 7 except that the composition was modified as specified in Table 1 and the temperature of the various extruder zones was established as 200° C., 220° C., 240° C., 240° C., 2 40° C. in the case of polycaprolactam(polyamide-6), and 240° C., 270° C., 280° C., 285° C., 280° C., 270° C. in the case of polyhexamethylenediadipate (polyamide-66). The results are provided in Table 5.

<Comparative Example 19>

The same procedure was carried out as described in Example 8 with using polyamide-6 resin and 0.5 wt. % of N,N'-hexamethylene-bis(3,5-di-t-butyl-4-hydroxy-hydrocinnamide) as thermal stabilizer and 0.9 wt. % of 2,2'-(4,4'-diphenylene)bis(3,1-benzooxazine-4-on).

<Example 14>

The same procedure was carried out as described in Example 1 except that polyethyleneterephthalate resin having an inherent viscosity of 0.63 dl/g was used, and the temperature of the various extruder zones was established as 240° C., 260° C., 285° C., 290° C., 280° C., 280° C., and 10 wt. % of polypropyleneglycol benzoate as plasticizer, and 30 wt. % of glass fiber having a length of 3.2 mm a diameter of 13 μm, and treated with aminosilane coupling agent, as reinforcing agents were added through a secondary opening.

Simultaneously, 0.5 wt. % of N,N'-di-β-naphthyl-p-phenylenediamine and 1.0 wt. % of 2,2'-bis(5,6-dihydro-4H-1,3-oxazine) was added thereto to prepare fiber reinforced PET resin.

The properties were measured by the same method as Example 1 and the results are provided in Table 7.

<Example 15~16>

The same procedure was carried out as described in Example 1 with the amount of components and properties provided in Table 6 and 7, respectively.

<Comparative Example 24>

The same procedure was carried out as described in Example 17 except using 0.5 wt. % of tetrakis[methylene-3-(3,5-di-t-butyl-4-hydroxyphenyl)propionate]methane and 0.8 wt. % of 2,2'-4,4'-diphenylene)bis(3,1-benzooxazine-4-on).

<Example 19>

The same procedure was carried out as described in Example 17 except that 45 wt. % of polycarbonate(UPILON S-2000) resin and 45 wt. % of polybutylene terephthalate resin having an inherent viscosity of 1.18 dl/g was added through the primary opening, and 10 wt. % of methacrylate-styrene-butadiene rubber was added as an impact-resistant reagent through a secondary opening and simultaneously the thermal stabilizers provided in Table 8 were added through a secondary opening to prepare a blended resin of polyearbonate and polybutyleneterephthalate.

<Comparative Example 25>

The same procedure was carried out as described in Example 17 except using 0.5 wt. % of tetrakis[methylene-3-(3,5-di-t-butyl-4-hydroxyphenyl)propionate]methane as thermal stabilizer and 0.5 wt. % of 2-(2-hydroxy-5-t-octylphenyl)benzotriazole as VW absorber.

<Comparative Example 26>

The same procedure was carried out as described in Example 17 except using 0.2 wt. % of tetrakis[methylene-3-(3,5-di-t-butyl-4-hydroxyphenyl)propionate]methane as thermal stabilizer and 0.4 wt. % of distearylthiodipropionate as thermal stabilizer.

<Example 20>

The same procedure was carried out as described in Example 7 except that 1,500 g of dimethylterephthalate, 1,300 g of 1,4-butanediol, 1.185 g of poly (tetramethyleneoxide)glycol having a number average molecular weight of 1,000 and 4 g of tetrabutyltitanate as catalyst were added to reactor and ester-exchange reaction was carried out at a temperature of 200° C. Then 11.1 g(0.4 wt.

% on the basis of polymer) of 4,4'-bis(4-α,α-dimethylbenzoyl)diphenylamine and 16.7 g(0.6 wt. % on the basis of polymer) of 2,2'-meta-phenylene(2-oxazoline) were added thereto and condensation reaction was carried out.

The temperature was raised over the period of 1 hr to 250° C. and the pressure was abated from normal pressure to 0.1 mmHg.

The condensation reaction was continuously carried out for 45 min under 0.1 mmHg pressure and polymerization was completed.

The moisture of the polyetherester block copolymer prepared by the present process was removed at a temperature of 110° C. for 6 hrs, and then removed at a temperature of 100° C. by using a hot air dryer.

Samples for measuring properties were injection molded by using an injection molder having 150 tons of clamping force, and the heat the resistance was estimated.

The results are provided in Table 11.

<Comparative Example 27>

The same procedure was carried out as described in Example 20 except using 0.4 wt. % of tetrakis[methylene-3-(3,5-di-t-butyl-4-hydroxyphenyl)propionate]methane as thermal stabilizer and 0.8 wt. % of tris(t-butyl)phenylphosphite as thermal stabilizer.

<Comparative Example 28>

The same procedure was carried out as described in Example 20 except using 0.4 wt. % of tetrakis[methylene-3-(3,5-di-t-butyl-4-hydroxyphenyl)propionate]methane as thermal stabilizer and 0.8 wt. % of N,N'-dipheny-p-phenylenediamine as thermal stabilizer.

<Comparative Example 29>

The same procedure was carried out as described in Example 20 except using 0.4 wt. % of tetrakis[methylene-3-(3,5-di-t-butyl-4-hydroxyphenyl)propionate]methane as thermal stabilizer and 0.8 wt. % of distearylthiodipropionate as thermal stabilizer.

<Comparative Example 30>

The same procedure was carried out as described in Example 20 except using 0.4 wt. % of tetrakis[methylene-3-(3,5-di-t-butyl-4-hydroxyphenyl)propionate]methane as thermal stabilizer and 0.8 wt. % of 2,2'-m-phenylenebis(2-axazoline) as thermal stabilizer.

<Comparative Example 31>

The same procedure was carried out as described in Example 20 except using 0.4 wt. % of tris(t-butyl-phenyl)phosphite and 0.8 wt. % of 2,2'-m-phenylenebis(2-oxazoline) as thermal stabilizer.

<Comparative Example 32>

The same procedure was carried out as described in Example 20 except using 0.4 wt. % of distearylthiodipropionate and 0.8 wt. % of 2,2'-m-phenylenebis(2-oxazoline).

<Example 21>

The same procedure was carried out as described in Example 1 except that E390FNAT(ELASTOLLAN INC. Japan), a thermoplastic polyurethane elastomr was added through the primary opening and 0.4 wt. % of N,N'-di-o-tolyl-ethylenedlamine and 0.5 wt. % of 2,2'-tetramethylene bis(4-methyl-5(4H)-oxazoline) as thermal stabilizer (based on the total of polyurethane resin) were added through a secondary opening.

The temperature of the extruder zones were 100° C., 140° C., 200° C., 220° C., 200° C. and 200° C.

Samples were injection molded and thermal stability was evaluated, providing the results reported in Table 13.

<Comparative Example 33~35>

The same procedure was carried out as described in Example 21 with the amount of thermal stabilizer provided in Table 12.

<Example 22>

The same procedure was carried out as described in Example 1, except that CARIFLEX TR 1186(SHELL), a thermoplastic styrene elastomer was added through the primary opening and the thermal stabilizers provided in Table 14 (based on the total 100% of resin) were added through a secondary opening.

The temperatures of the zones of the extruder were 100° C., 130° C., 170° C., 180° C., 200° C. and 180° C.

Samples were injection molded and thermal stability was evaluated providing the results shown in Table 15.

<Comparative Example 36~38>

The same procedure was carried out as described in Example 22 with the amount of thermal stabilizer provided in Table 14.

<Example 23>

The same procedure was carried out as described in Example 1 except that SANTOPRENE 101-80 (MONSANTO), a thermoplastic polyolefin elastomer was added through the primary opening and the thermal stabilizers provided in Table 16 (based on the total 100% of olefin resin) were added through a secondary opening.

The temperatures of the various zones of extruder were 100° C., 140° C., 180° C., 180° C., 200° C., and 190° C.

Samples were injection molded and thermal stability was evaluated providing the results summarized in Table 17.

<Comparative Example 39~41>

The same procedure was carried out as described in Example 23 with the amount of thermal stabilizer provided in Table 16.

<TABLE 1>

| Section | Resin | AON type | AON amount (wt %) | SAO type | SAO amount (wt %) |
|---|---|---|---|---|---|
| Example 1 | PBT | A | 0.5 | A | 1.0 |
| Example 2 | PBT | B | 0.3 | C | 0.5 |
| Example 3 | PBT | C | 0.7 | F | 0.3 |
| Example 4 | PBT | G | 0.3 | G | 0.6 |
| Example 5 | PBT | J | 0.3 | J | 1.5 |
| Example 6 | PBT | G | 0.4 | D & H | 0.4, each |
| Comparative Example 1 | PBT | D | 0.6 | — | — |
| Comparative Example 2 | PBT | — | — | K | 1.0 |
| Comparative Example 3 | PBT | — | — | — | — |
| Comparative Example 4 | PBT | — | — | — | — |

<TABLE 1>-continued

|  |  | AON |  | SAO |  |
|---|---|---|---|---|---|
| Section | Resin | type | amount (wt %) | type | amount (wt %) |
| Comparative Example 5 | PBT | — | — | — | — |
| Comparative Example 6 | PBT | — | — | — | — |
| Comparative Example 7 | PBT | — | — | — | — |
| Comparative Example 8 | PBT | — | — | — | — |
| Comparative Example 9 | PBT | — | — | — | — |
| Comparative Example 10 | PBT | — | — | — | — |

※ PBT: Polybutyleneterephthalate

<TABLE 2>

| Section | Elongation (%) | Impact strength (kg · cm/cm) | Thermal stability (%) |
|---|---|---|---|
| Example 1 | 187 | 4.2 | 62 |
| Example 2 | 172 | 4.1 | 60 |
| Example 3 | 164 | 4.3 | 58 |
| Example 4 | 176 | 4.2 | 62 |
| Example 5 | 152 | 3.9 | 48 |
| Example 6 | 163 | 4.0 | 59 |
| Comparative Example 1 | 63 | 2.7 | 23 |
| Comparative Example 2 | 112 | 3.1 | 32 |
| Comparative Example 3 | 17 | 2.3 | 19 |
| Comparative Example 4 | 35 | 2.5 | 26 |
| Comparative Example 5 | 49 | 2.7 | 21 |
| Comparative Example 6 | 57 | 2.5 | 23 |
| Comparative Example 7 | 55 | 2.4 | 31 |
| Comparative Example 8 | 43 | 2.2 | 19 |
| Comparative Example 9 | 52 | 2.6 | 18 |
| Comparative Example 10 | 36 | 2.5 | 26 |

※ Thermal stability: After 0.25 inch of a bar specimen was heat treated at 200° C. for 20 hours, the thermal stability was expressed as the ratio of maintained NOTCHED IZOD impact strength Thermal stability = $\dfrac{\text{impact strength after heat treatment}}{\text{initial impact strength}}$

<TABLE 3>

| Section | Inherent viscosity | melting point (°C.) | Impact strength (kg · cm/cm) | Thermal stability (%) |
|---|---|---|---|---|
| Example 7 | 0.87 | 223 | 4.3 | 62 |
| Comparative Example 11 | 0.73 | 224 | 3.8 | 26 |
| Comparative Example 12 | 0.82 | 222 | 2.9 | 28 |
| Comparative Example 13 | 0.79 | 224 | 2.6 | 27 |
| Comparative Example 14 | 0.78 | 223 | 2.8 | 38 |

<TABLE 4>

|  |  | AON |  | SAO |  |
|---|---|---|---|---|---|
| Section | Resin | type | amount (wt %) | type | amount (wt %) |
| Example 8 | PA-6 | F | 1.0 | J | 0.7 |
| Example 9 | PA-6 | H | 0.8 | K | 0.4 |
| Example 10 | PA-6 | J | 0.5 | L | 0.9 |
| Example 11 | PA-66 | D | 1.0 | M | 0.8 |
| Example 12 | PA-66 | E | 0.5 | A | 2.0 |
| Example 13 | PA-66 | H | 1.0 | B & L | 0.4, each |
| Comparative Example 15 | PA-6 | F | 0.5 | — | — |
| Comparative Example 16 | PA-6 | — | — | L | 1.0 |
| Comparative Example 17 | PA-6 | — | — | — | — |
| Comparative Example 18 | PA-66 | — | — | — | — |
| Comparative Example 19 | PA-6 | — | — | L | 0.9 |

※ PA-6: polyamide-6    PA-66: polyamide-66

<TABLE 5>

| Section | Elongation (%) | Impact strength (kg · cm/cm) | Thermal stability (%) |
|---|---|---|---|
| Example 8 | 203 | 6.3 | 78 |
| Example 9 | 198 | 7.2 | 67 |
| Example 10 | 186 | 5.8 | 76 |
| Example 11 | 62 | 6.4 | 79 |
| Example 12 | 73 | 5.2 | 86 |
| Example 13 | 57 | 4.7 | 89 |
| Comparative Example 15 | 82 | 4.3 | 39 |
| Comparative Example 16 | 74 | 4.6 | 47 |
| Comparative Example 17 | 42 | 4.2 | 32 |
| Comparative Example 18 | 53 | 3.9 | 46 |
| Comparative Example 19 | 69 | 4.1 | 41 |

※ Thermal stability: After polyamide 6 was heat-treated at 200° C. for 200 hrs, and polyamide 66 was heat-treated at 230° C. for 200 hrs, thermal stability was measured using the same method as Table 2.

<TABLE 6>

|  |  | AON |  | SAO |  |
|---|---|---|---|---|---|
| Section | Resin | type | amount (wt %) | type | amount (wt %) |
| Example 14 | FR-PET | A | 0.5 | A | 1.0 |
| Example 15 | FR-PET | B | 0.3 | C | 0.5 |
| Example 16 | FR-PET | C | 0.7 | F | 0.3 |
| Comparative Example 20 | FR-PET | — | — | — | — |
| Comparative Example 21 | FR-PET | — | — | — | — |
| Comparative Example 22 | FR-PET | — | — | — | — |
| Comparative Example 23 | FR-PET | — | — | — | — |

※ FR-PET: Glass fiber reinforced polyethylene terephthalate resin

<TABLE 7>

| Section | Tensile strength (%) | Impact strength (kg · cm/cm) | Thermal stability (%) |
|---|---|---|---|
| Example 14 | 1,470 | 7.4 | 72 |
| Example 15 | 1,450 | 8.2 | 74 |
| Example 16 | 1,500 | 8.6 | 69 |
| Comparative Example 20 | 1,420 | 7.1 | 36 |
| Comparative Example 21 | 1,480 | 7.7 | 42 |
| Comparative Example 22 | 1,440 | 7.0 | 48 |
| Comparative Example 23 | 1,440 | 7.2 | 45 |

※ Thermal stability: After a dumbbell type specimen was heat treated at 210° C. for 500 hrs, thermal stability was measured using the ratio of maintained tensile strength.

<TABLE 8>

| | | AON | | SAO | |
|---|---|---|---|---|---|
| Section | Resin | type | amount (wt %) | type | amount (wt %) |
| Example 17 | GF-PC | L | 0.8 | I | 1.0 |
| Example 18 | GF-PC | E | 1.0 | D | 0.6 |
| Comparative Example 24 | GF-PC | — | — | — | — |
| Example 19 | PC/PBT | C | 0.6 | C | 0.7 |
| Comparative Example 25 | PC/PBT | — | — | — | — |
| Comparative Example 26 | PC/PBT | — | — | — | — |

※ GF-PC: Glass fiber reinforced polycarbonate    PC/PBT: Composite resin of polycarbonate and polybutylene terephthalate

<TABLE 9>

| Section | Elongation (%) | Impact strength (kg · cm/cm) | Thermal stability (%) |
|---|---|---|---|
| Example 17 | 6 | 11 | 55 |
| Example 18 | 5 | 10 | 60 |
| Comparative Example 24 | 4 | 6 | 33 |
| Example 19 | 123 | 72 | 74 |
| Comparative Example 25 | 110 | 68 | 47 |
| Comparative Example 26 | 121 | 65 | 49 |

※ Thermal stability: After 0.25 inch of a bar specimen was heat treated at 200° C. for 400 hrs, the thermal stability was measured using the same method as Table 2.

<TABLE 10>

| | | AON | | SAO | |
|---|---|---|---|---|---|
| Section | Resin | type | amount (wt %) | type | amount (wt %) |
| Example 20 | TPEE | G | 0.5 | G | 1.0 |
| Comparative Example 27 | TPEE | — | — | — | — |
| Comparative Example 28 | TPEE | — | — | — | — |
| Comparative Example 29 | TPEE | — | — | — | — |
| Comparative Example 30 | TPEE | — | — | — | — |
| Comparative Example 31 | TPEE | — | — | — | — |
| Comparative Example 32 | TPEE | — | — | — | — |

※ TPEE: Thermoplastic polyetherester block copolymerized elastomer

<TABLE 11>

| Section | Elongation (%) | Impact strength (kg · cm/cm) | Thermal stability (%) |
|---|---|---|---|
| Example 20 | 710 | NB | 92 |
| Comparative Example 27 | 695 | NB | 52 |
| Comparative Example 28 | 687 | NB | 74 |
| Comparative Example 29 | 703 | NB | 61 |
| Comparative Example 30 | 716 | NB | 49 |
| Comparative Example 31 | 726 | NB | 48 |
| Comparative Example 32 | 719 | NB | 54 |

※ Thermal stability: After a dumbbell specimen was heat treated at 150° C. for 200 hrs, the thermal stability was measured using the ratio of maintained elongation.

<TABLE 12>

| | | AON | | SAO | |
|---|---|---|---|---|---|
| Section | Resin | type | amount (wt %) | type | amount (wt %) |
| Example 21 | TPU | J | 0.5 | M | 0.5 |
| Comparative Example 33 | TPU | J | 0.5 | — | — |
| Comparative Example 34 | TPU | — | — | M | 0.5 |
| Comparative Example 35 | TPU | — | — | — | — |

※ TPU: Thermoplastic polyurethane elastomer

<TABLE 13>

| Section | Elongation (%) | Impact strength (kg · cm/cm) | Thermal stability (%) |
|---|---|---|---|
| Example 21 | 432 | NB | 43 |
| Comparative Example 33 | 365 | NB | 18 |
| Comparative Example 34 | 421 | NB | 24 |
| Comparative Example 35 | 332 | NB | 21 |

※ Thermal stability: After a dumbbell specimen was heat treated at 120° C. for 100 hrs, the thermal stability was measured using the same method as Table 11.

<TABLE 14>

| | | AON | | SAO | |
|---|---|---|---|---|---|
| Section | Resin | type | amount (wt %) | type | amount (wt %) |
| Example 22 | TPS | A | 1.0 | L | 1.0 |
| Comparative Example 36 | TPS | A | 1.0 | — | — |

TABLE 14-continued

| Section | Resin | AON type | AON amount (wt %) | SAO type | SAO amount (wt %) |
|---|---|---|---|---|---|
| Comparative Example 37 | TPS | — | — | L | 1.0 |
| Comparative Example 38 | TPS | — | — | — | — |

✻ TPS: Thermoplastic polystyrene elastomer

TABLE 15

| Section | Elongation (%) | Impact strength (kg · cm/cm) | Thermal stability (%) |
|---|---|---|---|
| Example 22 | 798 | — | 62 |
| Comparative Example 36 | 782 | — | 31 |
| Comparative Example 37 | 752 | — | 29 |
| Comparative Example 38 | 774 | — | 21 |

✻ Thermal stability: After a dumbbell specimen was heat treated at 120° C. for 100 hrs. the thermal stability was measured using the same method as Table 11.

TABLE 16

| Section | Resin | AON type | AON amount (wt %) | SAO type | SAO amount (wt %) |
|---|---|---|---|---|---|
| Example 23 | TPO | B | 0.7 | A | 1.0 |
| Comparative Example 39 | TPO | B | 0.7 | — | — |
| Comparative Example 40 | TPO | — | — | A | 1.0 |
| Comparative Example 41 | TPO | — | — | — | — |

✻ TPO: Thermoplastic polyolefine elastomer

TABLE 17

| Section | Elongation (%) | Impact strength (kg · cm/cm) | Thermal stability (%) |
|---|---|---|---|
| Example 23 | 416 | — | 49 |
| Comparative Example 39 | 407 | — | 32 |
| Comparative Example 40 | 415 | — | 26 |
| Comparative Example 41 | 392 | — | 19 |

✻ Thermal stability: After a dumbbell specimen was heat treated at 120° C. for 100 hrs, the thermal stability was measured using the same method as Table 11.

What is claimed is:

1. A thermally stabilized resin composition comprising a resin which contains a thermally stabilizing effective amount of one or more cyclic iminoether compounds represented by formula (I) or a cyclic iminoester compound represented by formula (II) or both, and an amine thermal stabilizer:

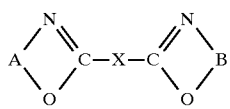
(I)

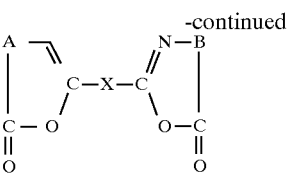
(II)

wherein, X is a single bond or a divalent organic group selected from $C_2$–$C_{10}$ alkylene, arylene selected from the group consisting of phenylene, naphthalene, and biphenylene, cyclic alkylene selected from the group consisting of cyclohexylene and cyclohexanedimethylene and $C_2$–$C_{10}$ alkylene containing a hetero atom, or X is a group of formula (III)

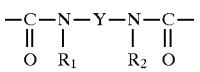
(III)

wherein, $R_1$ and $R_2$, are each, independently, selected from the group consisting of hydrogen, methyl, ethyl, propyl, butyl, hexyl, octyl, decal, phenyl, tolyl, cyclohexyl, and benzyl, Y is a divalent organic group selected from the group consisting of ethylene, propylene, butylene, pentamethylene, hexamethylene, octamethylene, nonamethylene, decamethylene, phenylene, naphthalene and diphenylene or a group of formula (IV):

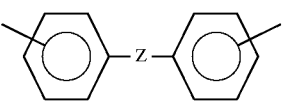
(IV)

wherein, Z is a member selected from the group consisting of —O—, —CO—, —S—, —SO2—, —CH$_2$—, —CH$_2$CH$_2$—, or —C(CH$_3$)$_2$—, cyclopentylene, cyclohexylene, methylene-phenylene and methylene-phenylenemethylene; and A and B are each, independently, a single bond, substituted or unsubstituted alkylene selected from the group consisting of methylene, ethylene, propylene, butylene, 1-methylethylene, 1,1-dimethylethylene, 1,2-dimethylene, 1-ethylethylene, 1,1-diethylethylene, 1-propylethylene, 1-butylene, 1-hexylethylene, and 1-methyltrimethylene; wherein said one or more of cyclic iminoether compounds of formula (I) or a cyclic iminoester compound of formula (II) or both are present in an amount of from 0.02 to 5.0 wt. % and said amine thermal stabilizer is present in an amount from 0.02 to 3.0 wt %.

2. The thermally stabilized resin composition according to claim 1, wherein said amine thermal stabilizer is selected from the group consisting of substituted phenylene-diamine, quinoline, diphenylamine, naphthylamine, mercaptobenzimidazole and thiourea wherein said substituted phenylenediamine is selected from the group consisting of N,N'-di-sec-butyl-p-phenylenediamine, N,N'-dipbenyl-p-pneylenediamine, N,N'-di-β-naphthyl-p-phenylenediamine, N,N'-bis(1-methyl-heptyl)-p-phenylenediamine, N,N'-bis(1-ethyl-3-methylphenyl)-p-phenylenediamine, N-phenyl-N'-isopropyl-p-phenylenediamine, N-cyclohexyl-N'-phenyl-p-phenylenediamine, dioctyl-p-phenylenediamine, phenylhexyl-p-phenylenediamine phenyl-octyl-p-phenylenediamine, diheptyl-p-phenylenediamine, N-1,3-dimethylbutyl-N'-phenyl-p-phenylene diamine, N-octyl-N'-phenyl-p-phenylenediamine and N,N'-di-(1,4-dimethylpentyl)-p-phenylenediamine.

3. The thermally stabilized resin composition according to claim 1, wherein X is a single bond or phenylene.

4. The thermally stabilized resin composition according to claim 1, wherein the total amount of cyclic iminoether of formula (I), cyclic iminoester of formula (II) and amine thermal stabilizer is from 0.04 to 6.0 wt. %.

5. The thermally stabilized resin composition according to claim 1, wherein the total amount of cyclic iminoether of formula (I), cyclic iminoester of formula (II) and amine thermal stabilizer is from 0.04 to 6.0 wt. %.

6. The thermally stabilized resin composition according to claim 1, wherein said resin is a member selected from the group consisting of polyethylene LLDPE(liner low density polyethylene), polypropylene, polybutylene, polystyrene, polyvinylchloride, polyacrylonitrile, ABS(acrylonitrile-butadiene-styrene), polyacetal, polyester, polyamide, polycarbonate, polyphenylene oxide, natural rubber, butadiene rubber, nitrile rubber, isoprene, chloroprene, acryl rubber, styrene-butadiene elastomer, urethane elastomer, olefin elastomer, ester elastomer, amide elastomer, and mistures thereof.

7. The thermally stabilized resin composition according to claim 1, wherein said resin is rubber, thermoplastic elastomer, polyester or polyamide.

* * * * *